(No Model.)
W. BLACKWOOD, Jr.
WATER CLOSET.
No. 244,535. Patented July 19, 1881.
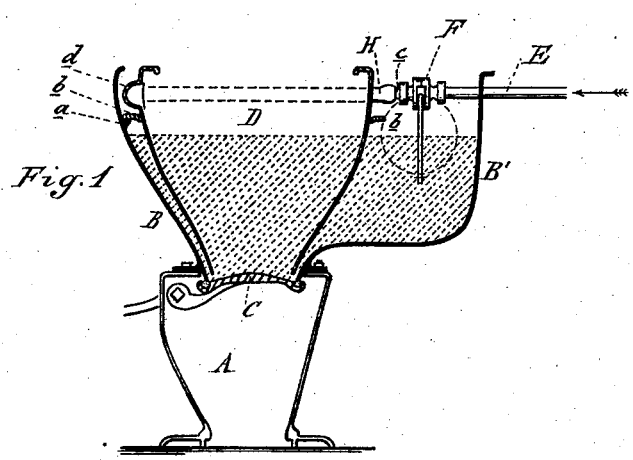
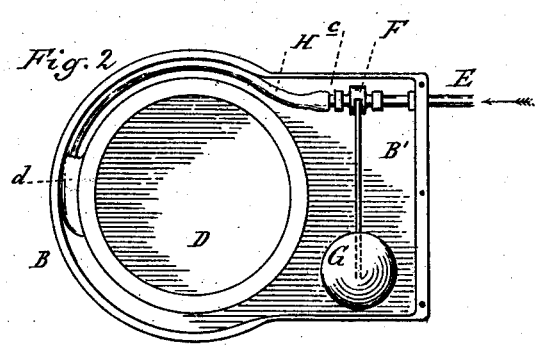
Attest:
A. Barthel
E. Scully
Inventor:
William Blackwood Jr.
by Thos. S. Sprague
Atty

UNITED STATES PATENT OFFICE.

WILLIAM BLACKWOOD, JR., OF DETROIT, MICHIGAN.

WATER-CLOSET.

SPECIFICATION forming part of Letters Patent No. 244,535, dated July 19, 1881.

Application filed April 8, 1881. (No model.)

*To all whom it may concern:*

Be it known that I, WILLIAM BLACKWOOD, Jr., of Detroit, in the county of Wayne, in the State of Michigan, have invented certain new and useful Improvements in Water-Closets, of which the following is a specification.

The nature of my invention relates to certain new and useful improvements in the construction of water-closets; and my invention consists in the peculiar construction and arrangement of parts, as more fully hereinafter described, and then pointed out in the claims.

Figure 1 is a vertical section of my improved closet, and Fig. 2 is a top plan of the same.

In the accompanying drawings, which form a part of this specification, A represents an ordinary cast-iron trunk, which is connected to the soil-pipe.

B represents a cast-iron bowl or shell, which is provided around one side with an enlargement, B', cast with and forming a part of said bowl. This bowl B is secured to the top of the trunk A, as in the usual manner, the lower end of said bowl being designed to be closed by a proper valve, C, to be operated by any proper "pull," as may be desired.

Projecting inwardly from the inner face of the circular portion of the bowl B are cast lugs a, and upon these lugs I rest a ring, b, said lugs and ring being somewhat below the upper end of the bowl.

D is a porcelain bowl, which sets into the ring b, being flush, or nearly so, with the top of the bowl B, while its lower end reaches to within an inch (more or less) of the trap C when closed, there being left an annular space around a greater portion of the bowl D, between it and the bowl B, and the entire space or chamber of the enlargement B'.

E is a water-supply pipe, which is provided with a proper valve, F, within the enlargement B', adapted to be closed and opened by the rise and fall of a float, G. This valve is provided with a nipple, c, over which may be slipped the end of a pipe, H, the opposite end of which is connected with the water-channel d of the porcelain bowl, the coupling at each end being such as will admit of the pipe being easily and quickly adjusted to place.

As the water in the bowl and in the enlargement in the outer case must necessarily be upon the same line or level, the float-valve should be so arranged that it will close its valve and stop the supply of water when the water in the bowl has reached the desired level. When the valve C is opened the water contained within the bowl-case B B' will pass into the trunk A, and thence into the soil-pipe, allowing the float G to fall and open its valve, allowing the flow of water through the pipe H to the bowl D, thoroughly washing and flushing it. When the valve C is again closed the valve F still remains open till sufficient water has flowed into the bowl to raise the float G and close the valve F.

When it becomes desirable to remove the bowl B for cleaning purposes said bowl is moved around on the ring b until its curved water-channel d has passed the end of the curved water-pipe H, when it can be raised vertically, both the pipe H and the channel d being made of the proper curve to admit of this operation.

All of the water-supply connections of this closet are located inside of the outer bowl, and any leakage from any of the joints falls directly into the outer bowl.

The valve C has an arm at one side, by which it is hinged to the trunk A, and its face is provided with an annular semicircular recess for receiving the circular packing-ring, which comes in contact with the lower end of the bowl D.

By this construction I provide a closet which is cheap in construction, and simple and effective in its operation, and which almost entirely precludes the possibility of the closet becoming soiled above the valve C, as there is an overcirculation of water upon all sides, while, if it is desirable for the purposes of scrubbing or repairing, the bowl D may be lifted from its seat upon the ring b, cleaned, and replaced, while at the same time a stronger and more thorough flush is obtained, as the water flows directly from both bowls to the discharge without being conducted thereto through pipes, as must be the case where a separate tank is provided, to secure the necessary amount of flush-water within which to operate the float-valve.

What I claim as my invention is—

1. The outer bowl or case, B, provided with lugs $a$, in combination with the ring $b$ and the tapering inner bowl, D, fitting within said ring, substantially as and for the purpose specified.

2. In a water-closet, and in combination with the outer case, B, lugs $a$, and ring $b$, the inner bowl, D, provided with the curved channel $d$ and the curved water-pipe H, substantially as and for the purpose specified.

WILLIAM BLACKWOOD, Jr.

Witnesses:
H. S. SPRAGUE,
E. SCULLY.